Patented Feb. 13, 1951

2,541,154

UNITED STATES PATENT OFFICE 2,541,154

AMINOALKOXYSILANES

Leo J. Clapsadle, Kenmore, N. Y., assignor to The Linde Air Products Company, a corporation of Ohio No Drawing. Application June 17, 1947, Serial No. 755,261

10 Claims. (Cl. 260—448.8)

The waterproofing of textile fibers and the like by the application thereto of silicon compounds has been studied by several investigators, and a few classes of silicon compounds have been proposed for the purpose. The mechanism of the waterproofing process has not been explained, largely because the waterproofing film is exceedingly tenuous, not subject to chemical analysis, and in fact invisible under a high-power microscope. Certain qualities desirable in silicon-containing waterproofing agents have been recognized. Thus, the agent should form a water-repellent film which is durable, even when subjected to laundering or dry cleaning; it should produce the film without resorting to measures (such as heating to high temperatures) which might damage the material to be waterproofed; and when materials such as cotton are to be treated, the waterproofing agent should not produce hydrochloric acid or other substance deleterious to the material. Enumeration of the objectives does not, however, give much help in selecting a waterproofing agent, and those which have been proposed are quite diverse in their chemical constitution.

I have formulated a hypothesis with respect to silicon-containing waterproofing agents which, whatever its validity, has led to the preparation of several excellent materials. In accordance with this hypothesis, the agent should consist of polar molecules having a part adapted to attach itself readily and firmly to the surface to be treated, and an opposed part which, when the molecules are oriented, will present itself to the air interface and form a water-repellent film. For this water-repellent part of the molecule I prefer a hydrocarbon radical, and for the opposed part of the molecule, adapted to promote adsorption on the treated surface, I prefer an amino structure.

It is obvious that silicon-containing molecules having opposed hydrocarbon and amino groups can be produced in many ways. One good method which I have studied extensively involves a reaction of the type:

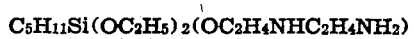

where R is a hydrocarbon radical, R' is alkyl, R'' is alkylene and R''' may be hydrogen or may be of complex nature as will more fully hereinafter appear.

An example of a reaction of the kind represented above is that between amyltriethoxysilane and monoethanolamine.

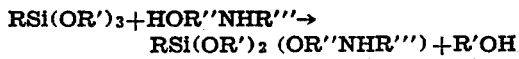

The reactants are merely refluxed together for several hours. The alcohol formed may be distilled off, if desired.

In order to provide a plurality of nitrogen atoms in the molecule, polyamines may be used instead of the simple amine depicted in the above example, the hydroxyalkyl alkylene polyamines being especially suitable. Thus, if for the monoethanolamine of the above example I substitute hydroxyethylethylenediamine, the reaction takes place on refluxing as before, but the resulting product seems to be $C_5H_{11}Si(OC_2H_5)_2(OC_2H_4NHC_2H_4NH_2)$ The preceding discussion has referred, for the most part, to reactions in which a single alkoxy group of an alkyltrialkoxysilane is replaced, but it will be understood that in the method of preparation described above, di- and tri- substituted molecules will also be formed, and the product will also contain small quantities of unreacted amine and ester. The di- and tri-substituted products are also effective waterproofing agents. Other methods of preparation also give mixtures, and these are excellent waterproofing agents after partial separation and purification, or without further treatment. Also, instead of the ester and amine being reacted in equimolecular proportions, either may be in excess. Preferably at least one-half mole of amine is reacted with each mole of the ester.

As has been indicated, the water-repellency attained depends, hypothetically, on a hydrocarbon group present in the treating agent; and this group may be either smaller (e. g. ethyl) or larger (e. g. 5-ethylnonyl) than the amyl group which has been specifically referred to. The preferred compounds are those in which the group in question contains at least 5 carbon atoms.

A suitable method of applying the waterproofing agent is as follows: A 3% solution of the reaction product of amyltriethoxysilane and hydroxyethylethylenediamine is prepared, with toluene as the solvent. Cotton cloth is dipped in the solution, drained, and the solvent allowed to evaporate. The cloth is then heated at 80° C. for one hour.

To summarize this disclosure with respect to the constitution of the waterproofing agents, it may be said that they have the type formula

where R is a hydrocarbon radical, R' is alkyl, $x$ and $y$ each stand for 1 or 2, $x+y=2$ or 3, and R'' is an alkyl radical containing at least one amino group.

What is claimed is:

1. Process of making a waterproofing agent which comprises reacting by heating a compound having the formula $R_xSi(OR')_{4-x}$ with a compound having the formula HOR'', where R and R' are alkyl, R" is an alkyl radical containing at least one amino group, and $x$ stands for 1 or 2.

2. Process of making a waterproofing agent which comprises reacting by heating a compound having the formula $RSi(OC_2H_5)_3$ with a compound having the formula HOR", where R is an alkyl radical and R" is an alkyl radical containing at least one amino group.

3. Process of making a waterproofing agent which comprises reacting by heating a compound having the formula $RSi(OC_2H_5)_3$ with an alkylolamine compound, where R is an alkyl radical.

4. Process of making a waterproofing agent which comprises reacting by heating a compound having the formula $RSi(OR')_3$ with an ethanolamine, where R is an alkyl radical containing at least five carbon atoms.

5. Process of making a waterproofing agent which comprises reacting by heating a compound having the formula $RSi(OR')_3$ with a hydroxyethylalkylenepolyamine where R and R' are alkyl.

6. Process of making a waterproofing agent which comprises reacting by heating amyltriethoxysilane with hydroxyethylethylenediamine, in the proportion of at least one-half mole of the amine to each mole of the ester.

7. A waterproofing agent having the formula $$R_xSi(OR')_y(OR'')_{4-x-y}$$

where R and R' are alkyl, $x$ and $y$ are integers, each no more than two, with $x+y$ equaling no more than three, and R" is an alkyl radical containing at least one amino group, produced by the reaction of an alkyl alkoxysilane with an alkanolamine.

8. A waterproofing agent having the formula $$RSi(OR')_2(OC_2H_4NHC_2H_4NH_2)$$

where R and R' are alkyl, produced by the reaction of an alkyl trialkoxysilane with hydroxyethyl ethylenediamine.

9. As a new composition of matter, the compound $$C_5H_{11}Si(OC_2H_5)_2(OC_2H_4NHC_2H_4NH_2)$$

produced by the reaction of amyl triethoxysilane with hydroxyethyl ethylenediamine.

10. A waterproofing agent containing the structure $$R_xSi(OR')_y(OC_2H_4NH_2)_{4-x-y}$$

where R and R' are alkyl, $x$ and $y$ are integers, each no more than two, with $x+y$ equaling no more than three, produced by the reaction of an alkyl alkoxysilane with monoethanolamine.

LEO J. CLAPSADLE.

REFERENCES CITED

The following references are of record in the file of this patent:

Volnov, "Jour. Gen. Chemistry," U. S. S. R., vol. 10 (1940), pages 1600–1604.

Richter, "Organic Chemistry," vol. 1, 3rd English edition (Offset Reprint) 1944, page 384.